United States Patent Office 3,546,310
Patented Dec. 8, 1970

1

3,546,310
ISOMERIZATION OF ACYCLIC TRIENES
Carlos G. Cardenas, Bartlesville, Okla., assignor to Phillips Petroleum Company, a corporation of Delaware
No Drawing. Filed Mar. 24, 1969, Ser. No. 809,933
Int. Cl. B01j 11/82; C07c 5/22
U.S. Cl. 260—677                              8 Claims

ABSTRACT OF THE DISCLOSURE

Acyclic trienes undergo double bond isomerization upon contact with a catalyst system prepared by admixing tetrahydrocarbylammonium hydroxides in aprotic polar solvent.

BACKGROUND OF THE INVENTION

This invention relates to the double bond isomerization of acyclic trienes. In another aspect, this invention relates to the double bond isomerization of acyclic trienes using a catalyst formed upon admixing tetrahydrocarbylammonium hydroxides in aprotic polar solvents. In accordance with another aspect, this invention relates to a catalyst system which is very effective for the double bond isomerization of acyclic trienes to internal conjugated trienes with relatively little cyclization. In accordance a further aspect, this invention relates to a catalyst system comprising the admixture formed from tetrahydrocarbylammonium hydroxides and aprotic polar solvent which is effective for the double bond isomerization of mixtures of trienes such as those containing the 1,3,7-octatrienes which have heretofore been stubbornly resistant to such isomerization.

In recent years, base-solvent systems have been found very useful in carrying out a number of catalytic conversions of hydrocarbons. For example, contacting a terminal monoolefin with a suitable base in dimethyl sulfoxide results in shifting the double bond of that internal olefin to a more central position.

However, when such base-solvent catalyst systems were applied to polyenes, the results obtained were generally not predictable. Part of the reason for this is that materials such as acyclic trienes have been known to respond erratically to different catalyst systems. For instance, a catalyst such as potassium piperidide has been found to very effectively convert 1,3,6-octatriene to the conjugated 2,4,6-octatriene, but with no effect on the 1,3,7-octatriene. Still other catalysts, such as magnesium oxide, have been found to be very active in isomerizing the 1,3,6-isomer and only partly effective with the 1,3,7-isomer. Still other catalysts such as selected bases, for example, potassium alkoxides, and selected polar aprotic solvents, such as dimethyl sulfoxide, have been found effective in converting both of the above-mentioned octatriene isomers, not to the conjugated product, but to heptadienes which are cyclic.

Thus, it is now surprising to find that a closely related catalyst system, namely, the tetrahydrocarbylammonium hydroxide-polar aprotic solvent system, of the present invention, can be used to shift the double bond of acyclic trienes with great effectiveness and with relatively little conversion to cyclic products.

2

Accordingly, an object of this invention is to provide an improved process for the conversion of acyclic trienes to conjugated products.

Another object of this invention is to provide a process and catalyst for the isomerization of acyclic trienes to double bond isomerization acyclic products.

A further object of this invention is to provide a novel base-solvent catalyst system effective for producing double bond isomerization products from acyclic trienes.

Other objects and aspects, as well as the several advantages of the invention, will be apparent to those skilled in the art upon reading the specification and the claims.

SUMMARY OF THE INVENTION

In accordance with the invention, a process is provided for the conversion of acyclic trienes to double bond isomerization acyclic products which comprises contacting at least one acyclic triene with a catalyst system formed by admixing (1) a tetrahydrocarbylammonium hydroxide as the base component with (2) a polar aprotic solvent selected from dialkyl sulfoxides, hexaalkyl phosphoramides, cyclic sulfones and cyclic sulfoxides.

Further, in accordance with the invention, acyclic trienes having 7 to 12 carbon atoms per molecule are isomerized to double bond conjugated products with relatively little cyclization by contacting with a base-solvent catalyst system prepared by the admixture of a tetrahydrocarbylammonium hydroxide and a polar aprotic solvent.

Further, in accordance with the invention, mixtures of acyclic trienes, particularly mixtures of octatrienes, are effectively converted to double bond isomerization products, especially internal conjugated trienes, with relatively little cyclization, by contacting with a catalyst system prepared by the admixture of a tetrahydrocarbylammonium hydroxide and a polar aprotic solvent.

Further, in accordance with the invention, a novel isomerization catalyst system is formed upon admixing a tetrahydrocarbylammonium hydroxide with a polar aprotic solvent selected from dialkyl sulfoxides, hexaalkyl phosphoramides and cyclic sulfoxides or sulfones.

In one embodiment, a mixture of 1,3,6- and 1,3,7-octatrienes are isomerized in high yield by contacting with benzyltrimethylammonium hydroxide in dimethyl sulfoxide to 2,4,6-octatriene.

DESCRIPTION OF THE PREFERRED EMBODIMENTS

The acyclic triene compounds which are suitable as starting materials for the process of the present invention are those corresponding to the following structural formulas:

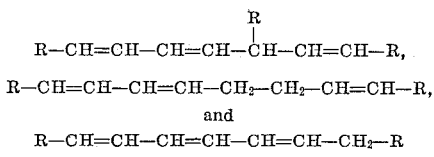

wherein each R is selected from hydrogen and straight or branched chain alkyl radicals such that the total number of carbon atoms in the acyclic triene is within the range of 7 to about 12, inclusive.

Exemplary triene compounds within these formulas include:

1,3,6-heptatriene
1,3,5-octatriene
1,3,6-octatriene
1,3,7-octatriene
1,4,6-octatriene
1,3,5-nonatriene
3-methyl-1,4,6-heptatriene
3,6,8-dodecatriene
5-methyl-3,6,8-undecatriene
3-n-pentyl-1,4,6-heptatriene
1,3,7-dodecatriene
1,3,5-decatriene
4,6,8-dodecatriene
1,3,7-undecatriene
5-ethyl-1,3,6-octatriene
1,4,9-decatriene
1,5,9-decatriene and the like, and mixtures thereof. The invention is most advantageously applied to trienes which have terminal, or non-conjugated, or non-centrally located double bonds.

The base component of the catalyst system of the present invention is represented by the following formula:

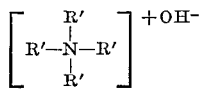

wherein each R' is selected from hydrocarbyl radicals having from about 1 to about 20, inclusive, carbon atoms per radical. The hydrocarbyl radicals can further be represented by aliphatic, cycloaliphatic and aromatic hydrocarbon groupings. Some examples of such R' groups are methyl, ethyl, 2-ethylhexyl, phenyl, allyl, propargyl, benzyl, cyclohexyl, dodecyl, eicosyl, and the like. The base components will generally have no more than about 25 carbon atoms per molecule.

Examplary base components within the formula include:

tetramethylammonium hydroxide
diphenyldiethylammonium hydroxide
tri(2-ethylhexyl)methylammonium hydroxide
cyclopentyltrimethylammonium hydroxide
diethyldivinylammonium hydroxide
tetraphenylammonium hydroxide
tetra(3-methylpentyl)ammonium hydroxide
benzyltrimethylammonium hydroxide
3-cyclohexenyltrimethylammonium hydroxide
p-tolyltrimethylammonium hydroxide
tetracyclohexylammonium hydroxide
tetra-n-butylammonium hydroxide
tripropylpropargylammonium hydroxide
dimethyldipropylammonium hydroxide and the like, and mixtures thereof.

The solvent component of the base-solvent catalyst system is a solvent selected from: dialkyl sulfoxides wherein the alkyl portion contains from 1 to 5 carbon atoms; hexaalkylphosphoramides wherein the alkyl groups contain from 1 to about 3 carbon atoms; tetrahydrothiophene-1,1-dioxide; 3 - methyl-tetrahydrothiophene-1,1-dioxide; tetrahydrothiophene-1-oxide; and 3-methyl-tetrahydrothiophene-1-oxide, and the like, and mixtures thereof. Preferred solvents are dimethyl sulfoxide and tetrahydrothiophene-1,1-dioxide (sulfolane). The proportion of the base component to the solvent component of the base-solvent catalyst system can vary over a broad range. Generally, from about 10 to about 100 parts of solvent will be used for each part of base, by weight. The catalyst system is prepared simply by mixing the base with solvent either in the presence or absence of the triene to be converted.

The isomerization reaction, according to the invention, is generally carried out at a temperature within the range of from about 20 to about 400° C., preferably 50–150° C., for a period of time varying from about 1 minute to about 10 days. Because the catalyst system of the present invention does not substantially promote cyclization regardless of reaction time, long reaction periods can be used if desired. However, there can be some loss of trienes due to other side reactions such as polymerization. Consequently, preferred reaction times will be in the range of from about 5 minutes to about 2 hours. The reaction pressure is not critical and the isomerization can be carried out at any convenient pressure in the range of from about 0 to about 2000 p.s.i.g. so long as a liquid phase is maintained.

The contact of acyclic triene and base-solvent catalyst system can be made using any conventional contacting apparatus and the reaction can be carried out either batchwise or continuously. The base-solvent catalyst system usage will be such that from about 0.001 to about 1 mole of tetrahydrocarbylammonium hydroxide compound will be present for each mole of the acyclic triene. However, concentrations outside this range can also be used if desired. Any conventional separation procedure can be used to recover the product.

The process of the present invention produces acyclic trienes in which the position of the double bonds have been altered from that of the starting material. Such products have utility for the production of homopolymers and copolymers with other unsaturated organic compounds. Such polymeric materials can be formed into useful products such as, for example, sheets, films, and the like. The products produced by the process of this invention can also be employed as chemical intermediates in the preparation of more complex organic compounds such as, for example, polyepoxide compounds which can be polymerized and/or utilized in such compositions as adhesives.

The invention can be further illustrated by the following examples.

EXAMPLE I

A 0.82 g. quantity of an octatriene mixture (prepared by the dimerization of butadiene in the presence of a zero-valent nickel complex and a hydroxylic solvent and consisting of about a 1:3 mixture of 1,3,6-octatriene and 1,3,7-octatriene contaminated with about 6% 4-vinylcyclohexene and about 1–2% of other unidentified materials) was diluted with 10 ml. dimethyl sulfoxide and sealed under nitrogen in a glass-walled pressure vessel equipped with a septum through which liquids could be injected. The vessel and contents were equilibrated at about 90° C. in an oil bath with stirring. A 0.25 ml. quantity of Triton B (benzyltrimethylammonium hydroxide, 40% in methanol) was injected. After continued stirring for 15 minutes, the vessel was removed from the bath and allowed to stand for 10 minutes. The contents were then poured into 20 ml. of water and the yellow organic layer was separated. The aqueous layer was extracted 5 times with 3 ml. portions of dichloromethane. The extracts were combined and the solvent was removed by evaporation. The remaining crude product, 0.67 g., was distilled at 58° C. (30 mm.) and gas-liquid chromatographic analysis of the distillate showed the presence of 2,4,6 - octatriene (85.3%), methylcycloheptadienes (3.6%), 4-vinylcyclohexene (5.8%), 1,3,7-octatriene (1.3%), and unidentified materials (4.1%). This analysis indicated that fractional distillation can be employed to produce 2,4,6-octatriene in a purity greater than about 95%. The calculated yields of 2,4,6-octatriene and methylcycloheptadienes were 74% and 3%, respectively. Conversion of 1,3,6- and 1,3,7-octatrienes to product was 99%.

This run clearly demonstrates that the process of the present invention is very effective in converting a mixture of octatrienes to 2,4,6-octatriene.

EXAMPLE II

Using the same reagents and much the same procedure as that described in the preceding example, the octatriene mixture was isomerized at 75° C.

A 4.32 g. quantity of the octatriene mixture was diluted with 50 ml. of dimethyl sulfoxide and treated with 1.25 ml. of the Triton B for 10 minutes at 75° C. The reaction mixture was cooled briefly and then quenched in 200 ml. of ice water. After separation, extraction, washing, drying, and distillation, 3.42 g. of the material was recovered. Gas-liquid chromatographic analysis indicated a 97% conversion and permitted calculation of yields of 77% and 2% for 2,4,6-octatriene and the methylcycloheptadiene respectively.

EXAMPLE III

In this example sulfolane (tetrahydrothiophene-1,1-dioxide) was used instead of the dimethyl sulfoxide in the isomerization of the mixed octatrienes.

A 3.74 g. quantity of the mixed octatrienes in 25 ml. of sulfolane were treated with 1.25 ml. of the Triton B and stirred at 90° for 1 hour. The reaction mixture was quenched in 50 ml. of ice water. The aqueous layer was extracted 4 times with 50 ml. portions of pentane, the extracts were combined, washed with water, and then dried by passage through anhydrous $MgSO_4$. Evaporation of the solvent gave 3.23 g. corresponding to an 85% yield of 2,4,6-octatriene accompanied by a 2% yield of methylcycloheptadiene. The conversion of the original octatrienes was about 65%.

EXAMPLE IV

The mixture of octatrienes was isomerized in sulfolane but at 80° C. for 2 hours.

A 4.20 g. quantity of octatrienes in 25 ml. of sulfolane was treated with 1.0 ml. of the Triton B for 2 hours at 80° C. The work-up yielded 3.76 g. of material. Gas-liquid chromatographic analysis indicated yields at 83% and 1% for 2,4,6-octatriene and the methylcycloheptadienes, respectively. The conversion of the original octatrienes was 69%.

EXAMPLE V

In the manner essentially identical to that of the preceding examples, the above-described mixture of octatrienes was isomerized but with several other solvents to show the effect of each solvent. Each of the runs was carried out at about 90° C. for 1 hour. In each run, 1 ml. of the mixed octatrienes was contacted with 0.25 ml. of the Triton B in 10 ml. of the specific solvent.

The simplified analysis of the reaction mixture obtained from each of these runs is shown in the table below:

TABLE 1.—ISOMERIZATION OF OCTATRIENES

| Run | Solvent | Starting material, percent | 2,4,6-octatriene, percent |
|---|---|---|---|
| 1 | Sulfolane | 28 | 72 |
| 2 | Dimethylformamide | 73 | 27 |
| 3 | Triglyme | 78 | 22 |
| 4 | Dioxane | 85 | 15 |
| 5 | Methyl Cellosolve | 90 | 10 |

The data in the table above show that methyl Cellosolve, dioxane, triglyme, and N,N-dimethylformamide provide a much slower isomerization rate for 1,3,6-octatriene and apparently do not affect the 1,3,7-isomer in a reasonable length of time. Sulfolane, on the other hand, provides a much more active system as does dimethyl sulfoxide as seen in previous examples.

I claim:

1. A process for the conversion of acyclic trienes having from 7–12, inclusive, carbon atoms per molecule to internal conjugated acyclic products with relatively little cyclization which comprises contacting under isomerization conditions at least one of said acyclic trienes with a catalyst system formed by admixing (1) a base-component selected from compounds represented by the formula $$\left[\begin{array}{c} R' \\ R'-N-R' \\ R' \end{array}\right]^+ OH^-$$

wherein each R' is selected from hydrocarbyl radicals having from about 1 to about 20, inclusive, carbon atoms per radical, with (2) a polar aprotic solvent selected from dialkyl sulfoxides, hexaalkylphosphoramides, cyclic sulfoxides and cyclic sulfones.

2. A process according to claim 1 wherein said acyclic trienes correspond to the following structural formulas:

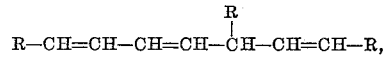

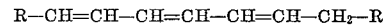

wherein each R is selected from hydrogen and straight or branched chain alkyl radicals such that the total number of carbon atoms in the acyclic triene starting material is within the range of 7 to 12, inclusive.

3. A process according to claim 1 wherein said acyclic trienes comprise a mixture of octatrienes including 1,3,6- and 1,3,7-octatrienes.

4. A process according to claim 1 wherein the isomerization temperature is in the range of 20 to about 400° C. and the reaction is carried out for a period of time ranging from about 1 minute to about 10 days, the amount of base and solvent used will be from 0.001 to about 1 mole of tetrahydrocarbylammonium hydroxide compound for each mole of acyclic triene and the amount of solvent present will range from 10 to about 100 parts per part of base component.

5. A process according to claim 1 wherein said acyclic trienes comprise a mixture of octatrienes including 1,3,7-octatrienes, said base component is benzyltrimethylammonium hydroxide (Triton B) and said solvent is dimethyl sulfoxide or sulfolane.

6. A process according to claim 1 wherein said solvent is selected from: dialkyl sulfoxides where in the alkyl portion contains from 1 to 5 carbon atoms; hexaalkyl phosphoramides wherein the alkyl groups contain from 1 to 3 carbon atoms; tetrahydrothiophene-1,1-dioxide; 3-methyl-tetrahydrothiophene-1,1 - dioxide; tetrahydrothiophene - 1 - oxide; and 3-methyl-tetrahydrothiophene-1-oxide.

7. Isomerization catalyst formed upon admixing (a) a base component represented by the general formula

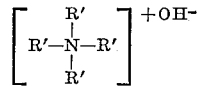

wherein each R' is selected from hydrocarbyl radicals having from about 1 to about 20, inclusive, carbon atoms per radical, with (b) a polar aprotic solvent selected from dialkyl sulfoxides wherein the alkyl portion contains from 1 to 5 carbon atoms; hexaalkyl phosphoramides wherein the alkyl groups contain from 1 to 3 carbon atoms; tetrahydrothiophene - 1,1 - dioxide; 3-methyl-tetrahydrothiophene-1,1-dioxide; tetrahydrothiophene-1-oxide; and 3-methyl-tetrahydrothiophene-1-oxide, the ratio of solvent to base being from 10 to 100 parts (b) per part (a).

8. A catalyst according to claim 7 wherein (a) is benzyltrimethylammonium hydroxide and (b) is dimethyl sulfoxide or sulfolane.

References Cited

UNITED STATES PATENTS

| 3,379,781 | 4/1968 | Zuech et al. | 260—666 |
| 3,441,629 | 4/1969 | Zuech | 260—683.2 |
| 3,217,050 | 11/1965 | Schriesheim et al. | 260—668 |
| 3,449,463 | 6/1969 | Kenton et al. | 260—677 |

DELBERT E. GANTZ, Primary Examiner

J. M. NELSON, Assistant Examiner

U.S. Cl. X.R.

252—426